(No Model.) 2 Sheets—Sheet 1.

J. G. KEITH.
WHEEL.

No. 531,618. Patented Dec. 25, 1894.

Witnesses.
M. A. Witmer.
Ambrose Risdon

Inventor
John G. Keith
by Cyrus Kehr
Atty.

(No Model.)  
J. G. KEITH.  
WHEEL.  
No. 531,618. Patented Dec. 25, 1894.
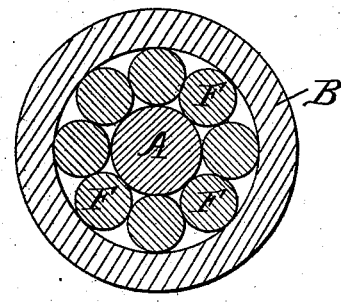
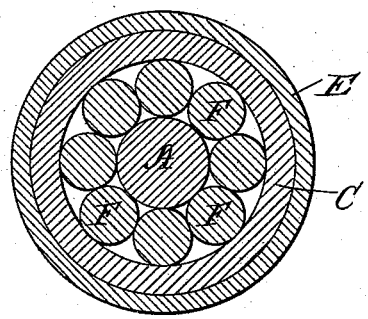
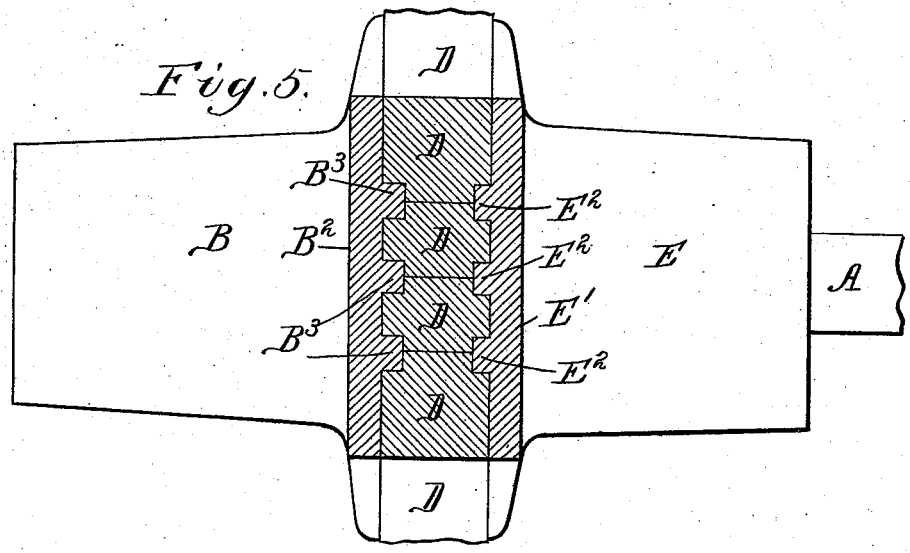
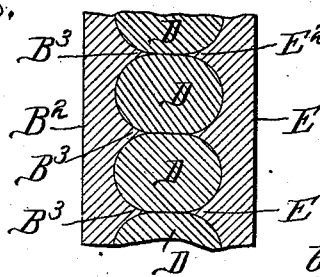
Witnesses.  
M. A. Witmer  
Ambrose Risdon  
Inventor  
John G. Keith  
by Cyrus Kehr  
Atty.

UNITED STATES PATENT OFFICE.

JOHN G. KEITH, OF CHICAGO, ILLINOIS.

WHEEL.

SPECIFICATION forming part of Letters Patent No. 531,618, dated December 25, 1894.

Application filed March 14, 1894. Serial No. 503,538. (No model.)

*To all whom it may concern:*

Be it known that I, JOHN G. KEITH, a citizen of the United States, residing at Chicago, in the county of Cook and State of Illinois, have invented certain new and useful Improvements in Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates particularly to vehicle wheels having hubs composed of pieces screwed to each other and separable from each other, whereby a broken part of the hub or broken spokes may be replaced without difficulty.

Figure 1:
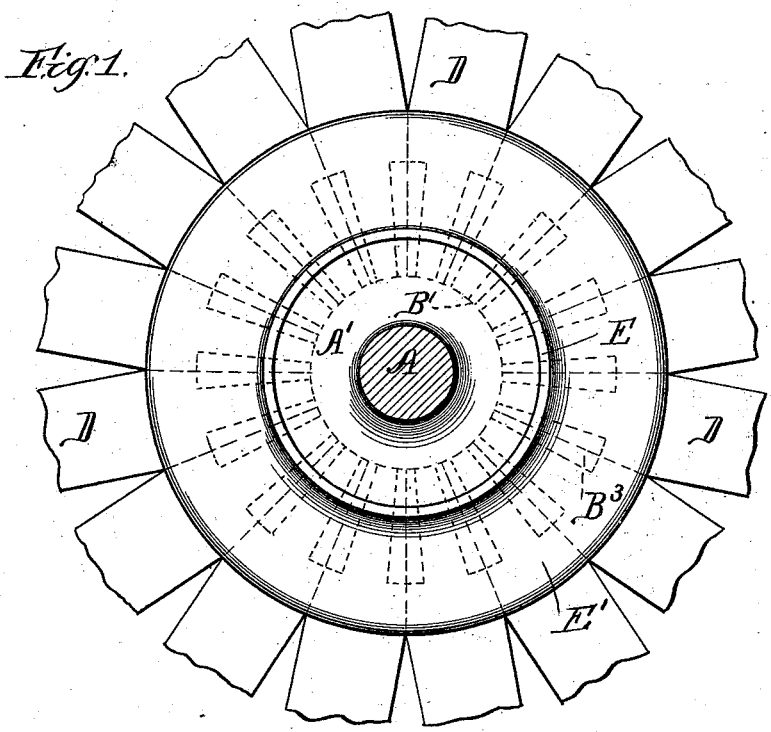
Figure 2:
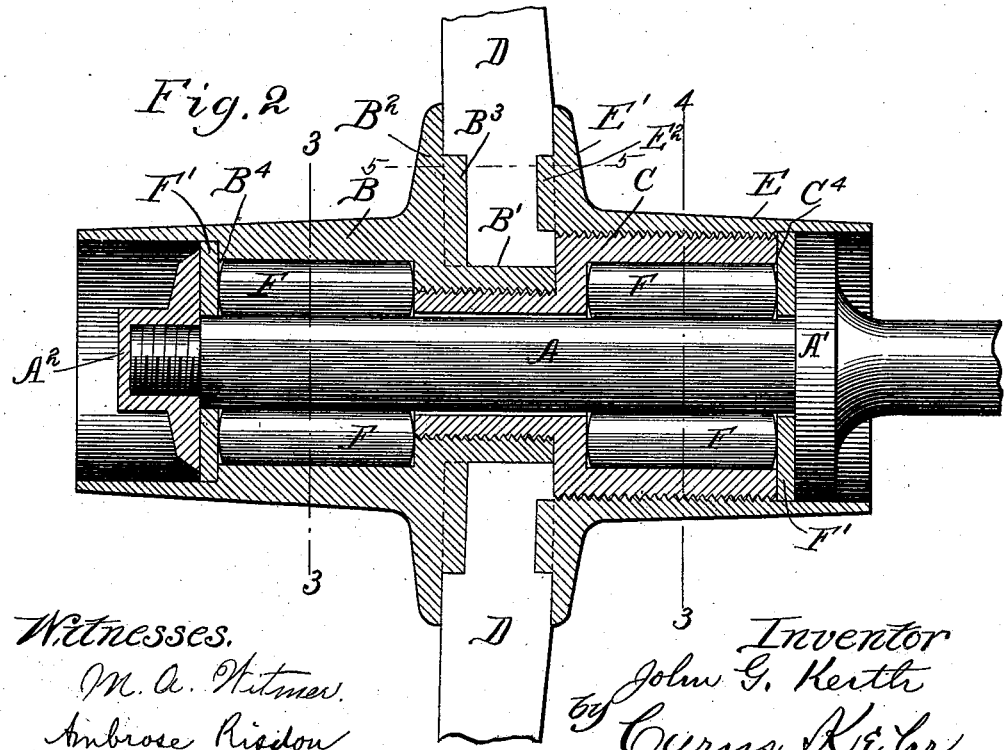

In the accompanying drawings: Figure 1 is a side elevation of a hub embodying my improvement, the spokes being cut off where they enter the hub. Fig. 2 is a central section parallel to the axle to which the wheel is applied. Fig. 3 is a section in line 3—3 of Fig. 2. Fig. 4 is a section in line 4—4 of Fig. 2. Fig. 5 is a section in line 5—5 of Fig. 2. Fig. 6 is a section showing a modification of the construction shown by Fig. 5.

A is the axle of the vehicle. This is of any suitable form, but has, preferably, a cylindric portion entering the hub and having at the inner end of the hub an annular shoulder, A′, and at the outer end the usual nut, A².

B is the outer section of the hub, and C is the inner section of the hub.

D D are the spokes.

The section, B, has a seat, B′, for the ends of the spokes, D. At the outer side of said seat a flange, B², rises from the section, B, and rests along the outer side of the spokes. Opposite each space between the spokes, an extension, B³, of said flange extends between the spokes. Between the inner ends of the spokes and the axle, the sections, B and C, telescope over each other and the meeting faces are screw threaded to each other.

E is a sleeve surrounded and threaded to the section, C, by threads of less pitch than the threads by which the sections, B and C, are joined. Adjacent to the inner side of the series of spokes, D, said sleeve, E, has a flange, E′, perpendicular to the axle, A. Extensions, E², extend from said flange into spaces between the spokes, D, similar to the extensions, B³, on the flange, B². The ends of the spokes may be angular as shown in Fig. 5, or rounded as shown in Fig. 6, and the extensions, B³, and E², may be shaped to adapt them to enter the spaces between the spokes of the particular form used.

In putting the wheel together, the spokes, D, are put into position upon the section, B, of the hub. Then the section, C, is turned partially through the sleeve, E, and then started into the section, B. On turning the section, C, farther, it is run rapidly into the section, B, and slowly through the sleeve, E, said sleeve being gradually drawn toward the spokes. The relation to or pitch of the threads between the sections, B and C, and between the sections, C, and sleeve, E, is to be such as to cause the flange, E′, to be pressed tightly against the spokes by the time the section, C, is driven fully into the section, B. It will be seen that the sleeve, E, cannot rotate after the extensions, E², enter the spaces between the spokes, D. Consequently the sleeve, E, may be turned back and forth upon the section, C, for adjustment until the distance the sections, C, must traverse to fully enter the section, B, is sufficient to draw the sleeve, E, and the extensions, E², into position with reference to the spokes, D, without again rotating the sleeve.

The sections, B and C, may be enlarged interiorly at each side of the over-lapping and threaded portions so as to form in said sections annular recesses, B⁴, and C⁴, respectively, for the reception of anti-friction rollers, F, of proper size to bear against the sections and the axle, A. The portions of said rollers toward the plane of the spokes may also abut against said sections, while the opposite portions may abut against washers, F′, the inner washer resting against the shoulder, A′, and the outer washer resting against the nut, A². Said washers may be omitted and the rollers, F, allowed to bear directly against the shoulder, A′, and the nut, A².

I claim as my invention—

1. In a wheel, the combination with the spokes, of a hub section having a seat, B′, upon which the spokes rest, a flange, B², having extensions, $B^3$, extending into the spaces between the spokes, a hub section, C, threaded to the section, B, a sleeve, E, threaded to the section, C, by threads differing in pitch from the threads joining the sections, B, and C, and having a flange, E', bearing extensions, $E^2$, extending into spaces between the spokes, substantially as described.

2. In a wheel, the combination with the spokes, of a hub section having a seat, B', upon which the spokes rest, a flange, $B^2$, having extensions, $B^3$, extending into the spaces between the spokes, a hub section, C, threaded to the section, B, a sleeve, E, threaded to the section, C, by threads differing in pitch from the threads joining the sections, B, and C, and having a flange, E', bearing extensions, $E^2$, extending into spaces between the spokes, the sections, B, and C, having annular recesses, $B^4$, and $C^4$, respectively, adapted to receive anti-friction rollers, F, substantially as described.

In testimony whereof I affix my signature, in presence of two witnesses, this 28th day of February, in the year 1894.

JOHN G. KEITH.

Witnesses:
CYRUS V. KEHR,
V. J. WYMAN.